US010675889B2

(12) United States Patent
Thetford

(10) Patent No.: US 10,675,889 B2
(45) Date of Patent: Jun. 9, 2020

(54) DISPERSANTS FOR COLOURATION OF CERAMIC TILES USING INK JET INKS

(71) Applicant: Lubrizol Advanced Materials, Inc., Cleveland, OH (US)

(72) Inventor: Dean Thetford, Rochdale (GB)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 38 days.

(21) Appl. No.: 15/735,425

(22) PCT Filed: Jun. 10, 2016

(86) PCT No.: PCT/US2016/036858
§ 371 (c)(1),
(2) Date: Dec. 11, 2017

(87) PCT Pub. No.: WO2016/201204
PCT Pub. Date: Dec. 15, 2016

(65) Prior Publication Data
US 2018/0171167 A1 Jun. 21, 2018

Related U.S. Application Data

(60) Provisional application No. 62/174,557, filed on Jun. 12, 2015.

(51) Int. Cl.
*B41J 11/00* (2006.01)
*B41J 2/01* (2006.01)
(Continued)

(52) U.S. Cl.
CPC .............. *B41J 11/002* (2013.01); *B41J 2/01* (2013.01); *B41M 5/007* (2013.01); *B41M 5/0047* (2013.01); *B41M 7/009* (2013.01); *B41M 7/0054* (2013.01); *C03C 17/02* (2013.01); *C03C 17/25* (2013.01); *C04B 41/009* (2013.01); *C04B 41/4539* (2013.01); *C04B 41/5022* (2013.01); *C04B 41/5027* (2013.01); *C04B 41/52* (2013.01); *C04B 41/81* (2013.01); *C04B 41/86* (2013.01); *C04B 41/87* (2013.01); *C04B 41/89* (2013.01); *C09C 1/0009* (2013.01); *C09C 3/041* (2013.01); *C09D 11/00* (2013.01); *C09D 11/033* (2013.01); *C09D 11/037* (2013.01); *C09D 11/106* (2013.01); *C09D 11/30* (2013.01); *C09D 11/32* (2013.01); *C09D 11/322* (2013.01); *C09D 11/326* (2013.01); *C09D 11/36* (2013.01); *C09D 17/002* (2013.01); *C09D 17/007* (2013.01); *C01P 2004/51* (2013.01); *C01P 2004/62* (2013.01); *C01P 2006/22* (2013.01); *C03B 25/02* (2013.01); *C03C 2217/445* (2013.01); *C03C 2217/72* (2013.01);

(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/00; B41M 5/0011; B41M 5/0017; B41M 5/0047; B41M 7/00; B41M 7/0072; B41M 5/52; B41M 5/5218; B41M 5/025; B41M 5/03; B41N 10/00

See application file for complete search history.

(56) References Cited

U.S. PATENT DOCUMENTS

2010/0263575 A1* 10/2010 Thetford .................. C09D 7/45
106/400
2011/0152142 A1* 6/2011 Psaila .................. C10M 125/10
508/165

(Continued)

FOREIGN PATENT DOCUMENTS

| WO | 2012/076438 A1 | 6/2012 |
| WO | 2015/031043 A1 | 3/2015 |
| WO | 2016/201204 A1 | 12/2016 |

OTHER PUBLICATIONS

Search Report of Corresponding International Application No. PCT/US2016/036858 dated Aug. 3, 2016.

(Continued)

Primary Examiner — Manish S Shah
(74) Attorney, Agent, or Firm — Vincent Cortese; Teresan Gilbert

(57) ABSTRACT

The invention provides dispersed inorganic mixed metal oxide pigment compositions in a non-aqueous media utilizing a dispersant having polyisobutylene succinic anhydride structure to disperse a mixed metal oxide pigment in the media. The metal oxide pigment is of the type used to colour ceramic or glass articles. A milling process using beads is also described to reduce the mixed metal oxide particle size to the desired range. A method of using the mixed metal oxide dispersion to digitally print an image on a ceramic or glass article using the dispersion jetted through a nozzle and subsequently firing the coloured article is also described.

6 Claims, No Drawings

(51) Int. Cl.
| | |
|---|---|
| *B41M 5/00* | (2006.01) |
| *C09D 11/32* | (2014.01) |
| *C09D 17/00* | (2006.01) |
| *C09D 11/30* | (2014.01) |
| *C09D 11/00* | (2014.01) |
| *C09D 11/326* | (2014.01) |
| *C04B 41/81* | (2006.01) |
| *C03C 17/02* | (2006.01) |
| *C04B 41/00* | (2006.01) |
| *B41M 7/00* | (2006.01) |
| *C03C 17/25* | (2006.01) |
| *C04B 41/45* | (2006.01) |
| *C04B 41/50* | (2006.01) |
| *C04B 41/52* | (2006.01) |
| *C04B 41/86* | (2006.01) |
| *C04B 41/87* | (2006.01) |
| *C04B 41/89* | (2006.01) |
| *C09C 1/00* | (2006.01) |
| *C09C 3/04* | (2006.01) |
| *C09D 11/033* | (2014.01) |
| *C09D 11/037* | (2014.01) |
| *C09D 11/106* | (2014.01) |
| *C09D 11/322* | (2014.01) |
| *C09D 11/36* | (2014.01) |
| *C09C 3/08* | (2006.01) |
| *C09C 3/10* | (2006.01) |
| *C03B 25/02* | (2006.01) |

(52) U.S. Cl.
CPC .... *C03C 2218/119* (2013.01); *C03C 2218/32* (2013.01); *C09C 1/00* (2013.01); *C09C 3/08* (2013.01); *C09C 3/10* (2013.01)

(56) References Cited

U.S. PATENT DOCUMENTS

| | | | |
|---|---|---|---|
| 2012/0154480 A1* | 6/2012 | Anthony | C09D 11/322 347/20 |
| 2013/0072704 A1* | 3/2013 | Thetford | C09D 11/03 554/107 |
| 2016/0200868 A1* | 7/2016 | Shooter | C08K 5/3417 106/31.13 |

OTHER PUBLICATIONS

Written Opinion of Corresponding International Application No. PCT/US2016/036858 dated Aug. 3, 2016.

\* cited by examiner

US 10,675,889 B2

DISPERSANTS FOR COLOURATION OF CERAMIC TILES USING INK JET INKS

CROSS REFERENCE TO RELATED APPLICATION

This application claims priority from PCT Application No. PCT/US2016/036858 filed Jun. 10, 2016, which claims the benefit of U.S. application Ser. No. 62/174,557 filed Jun. 12, 2015.

FIELD OF INVENTION

The dispersants and dispersed mixed metal oxide pigment compositions are useful for the colouration of ceramic articles and glass. The dispersed pigments are those of the type that develop their colouration during high temperature ceramic firing of a coating on the ceramic article or glass. The dispersed pigments are desirably suitable for jetting through a nozzle during a digitally controlled printing operation. The dispersants are polyisobutylene with maleic anhydride reaction products.

BACKGROUND OF THE INVENTION

Civilizations have made a variety of ceramic articles such as cooking and serving vessels, water and other fluid containers, tiles, bricks, etc., for thousands of years. These were typically coloured or decorated with metal oxide type pigments that developed colours or more intense colours during an elevated temperature firing of the pigment and ceramic article. The metal oxide type colouration pigments were thought to chemically interact and interpenetrate and develop colours at high temperatures with the ceramic composition and/or with more glassy compositions sometimes applied with the colouration pigments or subsequently applied. The more glassy compositions were often to provide impermeable or barrier properties to the outer surface of the ceramic article (to protect the ceramic article from environmental materials with which it might come into contact).

With conventional organic pigments and the few inorganic pigments (e.g., $TiO_2$, silica, and talc) in polymeric organic binder, the particle size and particle uniformity are very important to achieve consistent and intense colouration. Inorganic mixed metal oxide pigments used in inorganic ceramic colouration are generally not as well understood as organic pigments. The particle size of the inorganic mixed metal oxide pigments generally has not been studied and controlled to the extent that particle sizes of pigments has been controlled for use in polymeric organic coatings and inks.

U.S. Pat. No. 3,846,127 discloses an imaging system comprising photosensitive pigment dispersed in an insulating binder and exposed to actinic electromagnetic radiations. The pigment particles are treated with polyisobutylsuccinic anhydride or derivatives thereof before being incorporated in the imaging layer.

WO87/05924 discloses dispersions of solids in organic liquids where the dispersant has a molecular weight from 500 to 10,000. The solids can be inorganic or organic pigments. The use can be in paints, enamels, printings inks and other surface coatings, including articles made from plastics and rubber. Examples 1-13 include polyisobutylene based dispersants.

US 2008/0182927 discloses PIBSAs as dispersants for metal oxide nanoparticles in liquid including toluene, xylene, mineral spirits, hexanes, and phenoxyisopropanol. The metal oxides mentioned by name include those of zinc, zirconium, cerium titanium, aluminum, indium and tin. In their examples, they used alumina with a particle size of 30 nm, zirconia with a particle size of 15 nm, ceria with a particle size slightly less than 100 nm, and zinc oxide with a particle size of 30 nm.

SUMMARY OF THE INVENTION

More recently the printing industry has shifted away from traditional printing methods and is using digital printing instead. When considering converting mixed metal oxide dispersions for colouring ceramic articles from conventional gravure or screen printing processes, these ink formulations require better dispersants in order that they meet all the requirements needed to be jetted using a digital printer. There is also a need to quickly and efficiently reduce the particle sizes of inorganic metal oxide pigments by milling from their current commercially available sizes to $D_{50}$ number average particles sizes of less than 600 nm so the particles can be jetted through small openings of the ink jet printheads. While many pigments for conventional coatings or inks tend to be organic and have densities within 10 or 20 wt. % of the continuous organic media, mixed metal oxide pigments can have densities of 2 to 4 times that of the continuous phase, making such mixed metal oxide pigments much harder to keep dispersed as colloidal particles in an organic media.

A dispersant for mixed metal oxides has been identified as a reaction product of polyisobutylene with maleic acid and/or anhydride. It has been found that the above dispersants show excellent ability to facilitate milling and disperse inorganic pigments (preferably mixed metal oxide pigments) to produce colloidally stable mixed metal oxide dispersions in non-aqueous nonpolar organic media based ink jet inks for the colouration of ceramic tiles and glass using ink jet ink printers. Thus, according to the present invention, there is provided a composition comprising a particulate solid; a continuous media selected from aliphatic hydrocarbon, non-polar fatty acid ester or blends thereof; and a dispersing agent being a reaction product of polyisobutylene with maleic acid and/or anhydride.

Also provided is a method for milling the mixed metal oxide pigments using the reaction product of polyisobutylene with maleic acid and/or anhydride in minimal time and with minimal contamination of the mixed metal oxide dispersion by wear components from the mill and beads used in milling. The dispersant functions to facilitate milling by colloidally stabilizing new surfaces created by milling and preventing aggregations of milled particles into larger aggregates. Also provided is a method of formulating a digital ink for ink jet printing using the reaction product of polyisobutylene with maleic acid and/or anhydride dispersant of this disclosure. Also disclosed is a method of digitally printing using an ink jet printer and an ink with mixed metal oxide pigments and a reaction product of polyisobutylene with maleic acid and/or anhydride based dispersant.

DETAILED DESCRIPTION OF THE INVENTION

The invention relates to the use of a class of dispersants in ceramic ink jet inks formulations, to dispersions containing such dispersants together with a particulate solid (mixed metal oxides) and an organic medium (aliphatic hydrocarbon, fatty acid esters and combinations thereof), and compositions comprising a particulate solid, an organic medium and a dispersant and to their use in ceramic ink jet inks and mill-bases. Many formulations such as inks, paints and mill-bases require effective dispersants for uniformly distributing a particulate solid in an organic medium.

In one embodiment, the invention relates to a pigment dispersion composition comprising:
a) 79-20 wt. % of continuous liquid organic media, including aliphatic hydrocarbon, non-polar fatty acid ester medium or combinations thereof;
b) 20-60 wt. % of a mixed metal oxide ceramic pigment in particulate form that develops its full color intensity and hue after firing at elevated temperatures;
c) 1-20 wt. % of a dispersant being a reaction product of polyisobutylene with maleic acid and/or anhydride.

In one embodiment, the invention relates to a process for milling an inorganic mixed metal oxide particulate, having a dry powder volume average particle diameter $D_{50}$ in excess of 2 micron, in a continuous nonpolar organic medium to a $D_{50}$ particle size of less than 600 nanometres, said process comprising:
a) blending said continuous medium, said inorganic mixed metal oxide particulate, wherein said inorganic mixed metal oxide particulate is a mixed metal oxide pigment that develops its color intensity and hue after firing at elevated temperatures, optionally including a vitreous glaze material, having a dry powder volume average particle diameter in excess of 2 micron, and a dispersing agent being a reaction product of polyisobutylene with maleic acid and/or anhydride;
b) milling said mixed metal oxide pigment dispersed with said dispersing agent in said continuous medium using a bead mill for 5 minutes to 60 hours; and
c) confirming the volume average particle diameter $D_{50}$ is less than 600 nanometres.

In one embodiment, the invention relates to a process for digitally printing on ceramic article or glass article substrate using an ink jetted through a nozzle;
a) providing a mixed metal oxide dispersed in a continuous nonpolar organic medium with a dispersing agent being a reaction product of polyisobutylene with maleic acid and/or anhydride;
b) jetting said mixed metal oxide dispersed in said continuous medium using said dispersing agent onto said substrate to form a pigmented digital image (optionally on a pre-glaze layer(s) on a ceramic surface), wherein said pigmented digital image on said substrate develops into a colored image upon firing said ceramic substrate or heating said glass substrate to provide tempering or annealing;
c) optionally applying a glaze over said digital image; and
d) heating said ceramic article at an elevated temperature or heating said glass article to anneal or temper it, wherein said image from mixed metal oxide develops optimal color intensity upon heating to its color.

It is understood that the dispersing agent is generally as described above and being a reaction product of polyisobutylene with maleic acid and/or anhydride.

Definitions.

Organic media will mean liquids that are pourable at 25° C. and 670 mmHg atmospheric pressure, derived primarily from carbon and hydrogen and optionally having small amounts of oxygen and nitrogen. Desirably the amount of oxygen and nitrogen combined will be less than 10 wt. % of the atoms in the organic media. Organic will exclude low molecular weight hydrocarbons that have a boiling point of less than 40, 50 or 60° C. at 670 mmHg atmospheric pressure or binary compounds such as carbon oxides, carbides, carbon disulfide, phosgene, carbonates, etc. Desirable organic media include aliphatic and aromatic hydrocarbons and fatty acid esters from carboxylic acids and alcohols such as C6-C25 fatty acids and C3-C20 alcohols. Desirably the organic media has a molecular weight above 200 or 250 g/mole. Desirably the molecular weight is below 20,000 g/mole and more desirably less than 10,000; 5000; or 2000 g/mole. Desirably the amount of aromatic rings is less than 20, more desirable less than 10, and preferably less than 5 wt. % of the organic media. The term hydrocarbyl will refer to monovalent hydrocarbon groups that may optionally include other heteroatoms (such as O, N, F, Cl, and Br) in conventional or specified amounts. The term hydrocarbylene will refer to divalent hydrocarbon groups that may optionally include other heteroatoms in conventional or specified amounts. We will use the term hydrocarbyl to describe a hydrocarbon type group with one hydrogen removed. Hydrocarbyl in this specification will mean hydrocarbon like and can desirably include up to one oxygen and/or nitrogen for every four carbon atoms in the group, but preferably is just carbon and hydrogen atoms. For the avoidance of doubt, when we are counting carboxylic acid or carbonyl groups, we will count an anhydride of a dicarboxylic acid and an imide as having two carbonyl groups Desirably, the dispersions of mixed metal oxides, dispersing agent, and continuous media is adjusted to desirable viscosities for ink jet printing. Desirable viscosities include from about 1, 2, or 3 to about 15, 20, 30 or 50 cps at @30s$^{-1}$ at 25° C. as measured with a cone and plate type viscometer, such as the TA 2000EX Rheometer with a 2 aluminum cone In one embodiment, the molecular weight of the dispersant being a reaction product of polyisobutylene with maleic acid and/or anhydride and having a weight average molecular weight from 400 to 3000 g/mole, and preferably is from 500 or 650 to 2400 or 2500 g/mole as measured by GPC using polystyrene standards.

In one embodiment, an ink comprises a dispersion of a mixed metal oxide in a non-aqueous organic media. In another embodiment, the ink is in the form of an ink jet ink.

In another embodiment, the ink is in an ink jet printer cartridge comprising a chamber which contains the ink including the continuous media, the dispersant, the mixed metal oxide pigments and any optional components to the dispersion or the ink.

Various preferred features and embodiments will be described below by way of non-limiting illustration.

The reaction product of polyisobutylene with maleic acid and/or anhydride (also known as polyisobutylene succinic anhydride reaction products) may be prepared by processes known to a skilled person. They will comprise at least one polyisobutylene chain and at least one unit derived from coupling the maleic acid and/or anhydride to the polyisobutylene. The maleic acid and/or anhydride will often lose the double bond or the double bond will migrate during coupling to a slightly different location. As these reactions typically occur above 100° C. or 150° C., any maleic acid is generally converted to maleic anhydride. The term succinic is used in lieu of maleic and refers to the same grouping of atoms but with the carbon to carbon double bond converted to a carbon to carbon single bond in the coupling reaction. The maleic anhydride ring can open forming maleic acid during the coupling reaction or after the coupling reaction or vice versus if maleic acid is used as the starting material. The reaction product of polyisobutylene with maleic acid and/or anhydride is sold commercially by many parties in the lubricating oil field (e.g. Orinite in the US and China, Texas Petroleum Corp. and Daelim in South Korea) and in emulsion explosives as polyisobutylene succinic anhydride reaction products. There is an article on characterizing such materials titled "Characterization of Polyisobutylene Succinic Anhydride Chemistries Using Mass Spectroscopy, J. of Applied Polymer Science, Vol. 124, Issue 4, pp 2682-2996 (published online 2 Nov. 2011) 2012 by authors Edgardo Rivera-Tirado et al. One process called the ene-type reaction does not require chlorine and uses a material called highly reactive polyisobutylene (PIB) which has a highly reactive terminal vinylidene group (called high vinylidene PIB). This first process is described in EP 1585773A1 and U.S. Pat. No. 6,077,909 (e.g. column 6 line 14 through col. 7, line 62 and column 9, line 10 through col. 10, line 11). High vinylidene PIB is made by a particular polymerization process. A second process is called the Diels-Alder type reaction and chlorine during this reaction is useful. This second process uses a low vinylidene PIB. The Diels-Alder type reaction can be higher temperature, e.g. 180-250° C. under an inert gas (low in oxygen nitrogen or argon). The second process is described in U.S. Pat. No. 4,234,435. US 2005/0202981 paragraphs 0014-0017 also describe the reaction of polyisobutylene with maleic anhydrides to form succinated polyiosbutylenes of various structures.

The reaction product of polyisobutylene with maleic acid and/or anhydride (also known as polyisobutylene succinic anhydride) can vary in composition depending on the molar ratio of maleic anhydride to polyisobutylene and the reaction conditions. Using the number of moles of maleic anhydride is from 1 to 2, 3 or 4 relative to the number of moles of polyisobutylene. Thus, the number of maleic (sometimes referred to as succinic) anhydride groups added to each polyisobutylene can vary from 1 to 4 and usually varies from 1 to 2 or 3. The mgKOH/g gives an indication of the number of potential carboxylic acid groups derived or derivable from the ring opening the maleic anhydride. The acid number as used herein represents the number of acid groups on the polyisobutylene along with 2 times the equivalents of non-opened anhydride groups on the polyisobutylene. A factor of 2 is used on the anhydride groups because each anhydride is capable of forming 2 acid groups when the anhydride ring is opened. Usually, the reaction product is also characterized by the number average molecular weight of the polyisobutylene or the number average molecular weight of the reaction product. If one has both the number average molecular weight of the polyisobutylene and the acid number, one can calculate the relative number of carboxylic acid groups per polyisobutylene chains.

The reaction product of polyisobutylene with maleic acid and/or anhydride (e.g. polyisobutylene succinic anhydride) is also referred to as hydrocarbyl-substituted acylating agent in the literature. In some literature, the hydrocarbyl substituted acylating is then reacted with an amine and/or alcohol to create a polar head group that can react favorably with polar media or polar particulate. In this disclosure, it is preferred to keep the acylating agent in the acid or anhydride form, rather than forming a salt, ester, or amide linkage form. In the literature, the hydrocarbyl-substituted acylating agent can have a number average molecular weight of 110 to 5000, and in other instances of 140 to 3500, or 160 to 2500 or 500 to 1500. The hydrocarbyl substituent can be derived from an olefin or polyolefin. The polyolefin can be a homopolymer of a single $C_2$-$C_{10}$ olefin such as for example isobutylene or a copolymer of two or more $C_2$-$C_{10}$ olefins such as for example ethylene and propylene and optionally butadiene.

In a preferred embodiment of the invention the hydrocarbyl substituent is derived from a polyisobutylene which can have a vinylidene content of terminal double bonds that is low at 30% or less or that is high at 50% or more. The acylating agent can be derived from an alpha, beta-unsaturated monocarboxylic or polycarboxylic acid or reactive equivalent thereof to include an anhydride or an ester or an acid halide. Useful alpha, beta-unsaturated carboxylic acids or reactive equivalents thereof include for example methyl acrylate, fumaric acid and maleic anhydride. In an embodiment of the invention the alpha, beta-unsaturated carboxylic acid or reactive equivalent thereof is maleic anhydride. Methods to prepare a hydrocarbyl-substituted acylating agent are well known and generally involve for example heating a polyisobutylene or chlorinated polyisobutylene and maleic anhydride at 150 to 250° C., optionally in the presence of a promoter such as chlorine. One or sometimes more than one maleic group (succinic anhydride group after grafting) can be added to each polyisobutylene molecule. In one embodiment, it is desirable that at least 50, 75, or 85 mole % of the available combine anhydride and carboxylic acid groups remain in the respective acid or anhydride form and not react with additional species (such as alcohols, amino alcohols, amines, or cationic metals) until mixed with the mixed metal oxides. It is believed in this embodiment that the anhydride or carboxylic acid groups function as better anchors to the mixed metal oxides than do salts, ester linkages, amide, or imide linkages. In another embodiment, it is desirable that at least 50, 75, or 85 mole % of the measured acid number of the reaction product of polyisobutylene with maleic acid and/or anhydride be in the carboxylic acid form when combined with the mixed metal oxide. In this embodiment, it is believed that the carboxylic acid group forms a better anchoring group than the anhydride group or other derivatives of the acid or anhydride.

In another embodiment, the ink is of the type to be printed with digital versus analog technology and from an ink jet printer of the kind including piezo, thermal, acoustic and electrostatic mechanism to propel the ink from the printhead. Preferably, the printers utilized with these inks are of the piezo or electroacoustic drop on demand (DOD) type.

In another embodiment, the ink is printed on a substrate comprising either a ceramic object, e.g., tile or article including plates, bowls, saucers, cups, decorative ceramics, roofing tiles, or a glass substrate, e.g., pane or article such as a drinking glass, container, cup, etc.

Another embodiment is the ink jet ink is printed on a substrate, e.g., ceramic tiles, by single pass inline and glass articles by multi pass off line DOD printers.

The particulate solids are mixed metal oxides used in the colouration of ceramic tiles. A particular highlight includes the dispersion of metal contaminants present within the coloured mixed metal oxide inorganic pigments to produce a more homogeneous colour shade pattern free from streaks and striations caused by metal impurities and providing a much brighter shade.

The invention relates to the use of a class of dispersants in ceramic ink jet inks formulations, to dispersions containing such dispersants together with a particulate solid (mixed metal oxides) and a continuous nonpolar organic medium (which can comprise aliphatic hydrocarbon, non-polar fatty acid esters, and various blends thereof), and compositions comprising a particulate solid, a continuous medium and a dispersant and to their use in ceramic ink jet inks and mill-bases.

Coloration of ceramic tiles by ink jet inks is a rapidly growing technology and providing stable ink jet ink dispersions of mixed metal oxides with $D_{50}$ particle sizes below 600 nm in various continuous medium within a short milling time has been problematic.

Using the dispersant of the current application has provided stable ink jet ink dispersions containing mixed metal oxides with low particle sizes in a much-reduced milling time, better filterability of the dispersions leading to increased millbase yield and reduction of waste, much brighter shades and better dispersion of metal impurities found in the mixed metal oxides.

According to the present invention, there is provided a composition comprising a particulate solid, a continuous medium (non-aqueous), and a dispersing agent having reaction product of polyisobutylene with maleic acid and/or anhydride; used as or in part as an ink jet ink for the coloration of ceramic tiles using an ink jet ink printer.

The particulate solids can be mixed metal oxides or mixtures thereof, which may contain undesired metal impurities from abrasive wear of the milling equipment or beads, present as contaminants and/or as impurities from the milling process.

The continuous media can be aliphatic organic media (optionally with up to 30 wt. % aromatic hydrocarbons based on the combined weight of aliphatic and aromatic hydrocarbons), non-polar fatty acid esters, or compatible blends thereof.

The non-polar organic media can be a variety of low molecular weight (C3-C20) monohydric or polyhydric alcohols, glycols, polyglycols, condensed with low molecular weight C6-C25 mono and polycarboxylic acids, including fatty acids to form fatty acid esters.

In one embodiment, non-polar organic liquids are compounds containing aliphatic groups or mixtures thereof, preferably hydrocarbons of 6 to 40 carbon atoms, esters of various carboxylic acids of 6 to 25 carbon atoms with alcohols of 4 to 30 carbon atoms. The non-polar organic liquids include non-halogenated aliphatic hydrocarbons (e.g., linear and branched aliphatic hydrocarbons containing six or more carbon atoms both fully and partially saturated), and natural non-polar organics (e.g., vegetable oil, sunflower oil, linseed oil, terpenes and glycerides).

In one embodiment, the preferred solvents used in the dispersion of the ceramic mixed metal oxides with the dispersant reaction product of polyisobutylene with maleic acid and/or anhydride dispersants include petroleum distillate (various boiling fractions including $C_{16-20}$ alkanes mixtures and cyclic alkanes), paraffin, mineral spirit, octyl octanoate, 2-ethylhexyl-stearate, 2-ethylhexyl-cocoate, di-octyl adipate, isopropyl laurate, ethylhexyl cocoate, propylene glycol dicaprylate, triethylene glycol mono-2-ethylhexanoate, triethylene glycol bis-2-ethylhexanoate, tripropylene glycol methyl ether, dipropylene glycol (methyl ether), di-propylene glycol (n-butyl ether), isopropyl bisphenol s such as 2,2-bis(4-hydroxy-3-isopropyl-phenyl)propane, isopropyl myristate, isopropyl palmitate, isopropyl stearate, isocetyl laurate, isocetyl stearate, ethylhexyl palmitate, or mixtures thereof.

In one embodiment, the organic liquid media is free of water. As used herein, the expression substantially free of water indicates that the reaction contains a minimal amount of water, for instance contaminant or trace amounts not removed in normal processing. In one embodiment, the organic liquid of the continuous medium optionally contains less than 7, more desirably less than 5, and preferably less than 1 wt. % of water based on the weight of the dispersion. In one embodiment, the continuous media is free of water.

The organic liquid of the invention may be a non-polar organic medium. By the term "polar," in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Polar organic liquids generally have a dielectric constant of 5 or more as defined in the above-mentioned article. Non-polar liquids typically have a dielectric constant of less than 5.

Numerous specific examples of such moderately strong hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Advantages of the current dispersing agent would be reduced milling time, better dispersion of any metal impurities and/or contaminants leading to homogeneous coloured shades, brighter shades, better particle size stability during storage, improved filterability and increased dispersion/ink yield, reduced syneresis, reduced sedimentation and less phase separation between the dispersed phase and continuous phase during storage.

A preferred particulate solid is mixed metal oxides used in the colouration of ceramic tiles and glass. For the purposes of this invention, mixed metal oxides is interpreted as the solid containing at least two different metals in the same or different oxidation states. A particular improvement from using the dispersants of this disclosure includes the reduction of metal contaminants derived from abrasive wear of the milling equipment as the particular mixed metal oxides are hard to mill and require hard ceramic beads to mill these pigments. The dispersants of this disclosure tend to shorten the milling time required to meet a desirable particle size. When the total milling time on bead mills using hard ceramic beads is reduced, the amount of abrasive wear on both the beads and the internal components of the mill is generally reduced. Reducing the abrasive wear means less metal contaminants from the internal parts of the mill and the beads are introduced into the milled product. While metal contaminants are usually low in color in most pigment binder based coatings, metal contaminants can drastically affect color shade and color intensity in mixed metal oxides fired above 600° C. for colouring ceramic articles and glass.

This disclosure also provides for a method of milling a mixed metal oxide pigment having an initial volume average particle diameter in excess of 2 micron in a non-polar organic continuous phase to an average particle size of less than 700 or 600 nanometres, said process comprising:

a) blending a nonpolar organic medium, a mixed metal oxide pigment, optionally including a vitreous glaze material, having a 50% volume average particle diameter in excess of 2 micron, and a dispersing agent being a reaction product of polyisobutylene with maleic acid and/or anhydride;

b) milling said mixed metal oxide pigment dispersed with said dispersing agent in said non-polar organic medium using a bead mill; optionally at a milling rate of 0.4 to 8 KWatt/hour per Kg of particulate or 5 mins to 60 hours milling time; and c) confirming that the average particle diameter of 50% volume of the particles is less than 600 nanometres. In one embodiment, the particulate material can have a dry powder volume average particle diameter $D_{50}$ in excess of 2 micrometer at the start of the milling process.

This disclosure also provides a process for digitally printing on ceramic articles or glass articles using an ink jetted through a nozzle by
a) providing a mixed metal oxide pigment dispersed in a continuous nonpolar organic medium with a dispersing agent being a reaction product of polyisobutylene with maleic acid and/or anhydride, and wherein the particulate solid is a mixed metal oxide pigment that develops its color intensity and hue after firing at elevated temperatures;
b) jetting said mixed metal oxide dispersed in said continuous medium using said dispersing agent according to a digital image to form an image on a substrate (optionally on a pre-glaze layer on a ceramic surface) that develops color intensity on said ceramic or glass article during firing;
c) optionally applying a glaze over said digital image; and d) firing said ceramic article at a temperature above 600° C. or tempering or annealing said glass article at a temperature above 400° C. to cause said mixed metal oxide to develop its color.

The pre-glaze layer can be applied using traditional methods such as a curtain coater or spray coater. Alternatively, the pre-glaze layer could be applied using ink jet printer technology. Said pre-glaze layer above can be a single pre-glaze layer or multi pre-glaze layers. A pre-glaze layer is usually applied to help smooth the surface of a ceramic substrate and optionally adds components to the surface of the ceramic or glaze to optimize properties of the finished ceramic article. The pre-glaze layer(s) can include colorants.

It has been found that certain dispersants show excellent ability to disperse inorganic pigments (particularly those mixed metal oxides) to produce colloidally stable non-aqueous dispersions, non-aqueous ink jet ink dispersions and final non-aqueous ink jet inks for the colouration of ceramic tiles or glass using ink jet ink printers. Thus, according to the present invention, there is provided an ink jet ink composition comprising a mixed metal oxide particulate solid, a continuous medium and a dispersing agent being a reaction product of polyisobutylene with maleic acid and/or anhydride.

INDUSTRIAL APPLICATION

Coloration of ceramic tiles by ink jet ink technology is a rapidly growing application due to the variety and quality of images available for digital printing via ink jet inks. The particle size of the mixed metal oxides used in older printing processes for ceramic articles and tiles were often too large to easily pass through the nozzles of most ink jet printers. Providing colloidally stable ink jet ink dispersions of mixed metal oxides with $D_{50}$ particle sizes below 600 nm in various continuous medium within a short milling time has been problematic.

In one embodiment, the compound of Formula 1 is a dispersant for mixed metal oxide pigments of the type used to colour ceramic articles such as ceramic tiles or glass where the pigments are going to be exposed to firing at 600° C. and above to cause the pigments to go from a low intensity colour to an intense permanent color.

The particulate solid present in the composition may be any inorganic solid material (such as a pigment or glaze forming compound which is substantially insoluble in the organic medium) and which after firing at elevated temperatures provides a desirable color. In one embodiment, the particulate solid is a pigment. In another embodiment, the particulate solid is or includes an aluminum or silica rich compound that helps form the glaze compound.

In one embodiment, the ink composition of the invention provides improved jetting efficiency, reduce nozzle plugging, reduced settling, easier filterability, less frequent filter plugging, and more consistent jetting in applications where a mixed metal oxide pigment is jetted onto a ceramic article, such as a ceramic tile, roofing tile, plate, saucer, bowl, etc. or on glass article such as a pane, drinking glass, or in accordance with a digital image. In this application, the use of the dispersants of this disclosure result in low concentrations of metal and metal oxide wear contaminants from the milling equipment and beads/balls. In one embodiment, the composition provided lower pigment particle size, better colloidal stability, lower amounts of entrained metal from the internal mill surfaces and beads.

Preferred pigments for colouration of ceramic objects or glass are Pigment Yellow 159 (Zr—Si—Pr, zircon praseodymium yellow or praseodymium yellow zircon) such as BASF Sicocer® F Yellow 2200 and 2214; BASF Sicocer F Pink 10307; Pigment Red 232 (Zr—Si—Fe zircon) such as BASF Sicocer® F Coral 2300; Pigment Red 233 (Ca—Sn—Si—Cr, chrome tin pink sphene); Pigment Brown 33 (Zn—Fe—Cr, Spinel) such as BASF Sicocer® Brown 2700 and 2726; Pigment Blue 72 (Co—Al—Cr, Cobalt Spinel blue); Pigment Blue 28 (Co—Al spinel) such as BASF Sicocer® Blue 2501; Pigment Blue 36 (Co—Al spinel) such as BASF Sicocer® Cyan2500; Pigment Black 27 (Co—Mn—Fe—Cr spinel) such as BASF Sicocer® Black 2900; and Pigment White 12 (Zr—Si) such as BASF Sicocer® White EDT/AK-4409/2.

If desired, the compositions may contain other optional ingredients, for example, resins (where these do not already constitute the organic medium), binders, fluidizing agents, anti-sedimentation agents, plasticizers, surfactants, antifoamers, rheology modifiers, levelling agents, gloss modifiers and preservatives.

The compositions typically contain from 20 to 40 or 60% by weight of the particulate solid, the precise quantity depending on the nature of the solid and the relative densities of the solid and the continuous medium. For example, a composition in which the solid is an inorganic material, such as an inorganic pigment, filler or extender, in one embodiment contains from 20 to 60% by weight of the solid based on the total weight of composition.

The composition may be prepared by any of the conventional methods known for preparing dispersions for colouration of ceramic articles fired above 600° C. or for glasses annealed or tempered above 400° C. Thus, the solid, the continuous medium and the dispersant may be mixed in any order, the mixture then being subjected to a mechanical treatment to reduce the particles of the solid to an appropriate size, for example, by ball milling, bead milling, gravel milling or plastic milling until the dispersion is formed. It is anticipated that a variety of particle size and dispersing equipment can be used sequentially to minimize total milling time and expense, such that a large particle size pigment can be dispersed in a continuous media with the dispersant, an initial pre-mix or pre-mill grinding to a desired particle size range, and then transfer to a bead type mill to further break down particulate particles into the $D_{50}$ 200-600 nanometre diameter (by volume average particle size measurements).

In one embodiment, the beads used to mill the mixed metal oxide pigments are a ceramic bead rather than a metal bead. In further embodiments using ceramic beads, it is desirable that the ceramic beads are zirconium dioxide, yttrium stabilized zirconia, and/or silicon carbide. The beads are often 0.3 to 0.4 mm in diameter. The mills are often horizontal bead mills and a popular supplier of the mills is Netzsch. The milling often targets a medium value of the particle size distribution where a volume average particle diameter of $D_{50}$ of 600 or 300 nm or less and a $D_{90}$ of 800 or 500 nm or less is achieved. A $D_{50}$ of 300 nm is a value in which 50% of the particles present in a particle size distribution have diameters greater than 300 nm and 50% have diameters below 300 nm. Milling times are from about 5 minutes to 60 hours, and more desirably from about 5 minutes to 48 hours. In one embodiment, the energy used by the mill over the time period disclosed above ranges from 0.4 to 8 KWatt/hour per Kg of particulate produced to give $D_{50}$ particles in the range disclosed above. The mills may use some classification methods to separate smaller particles from larger particles and then mill the different sized particles to different extents. Solvent may be added during milling to control viscosity, solids contents, etc. Dispersant may be added sequentially or continuously during milling as milling increases the surface area of a gram of pigment and it reduces its $D_{50}$ average particle size from in excess of 2 micron to less than 600, 500, or 300 nanometre.

While not wishing to be bound by theory, it is hypothesized that some dispersants are more effective at getting to newly created surfaces during milling and stabilizing the new surfaces of fractured particles against aggregation into larger particles. Some dispersants are better anchored to particulates and better colloidally stabilize the particles during high energy mixing against agglomeration into larger sized particles.

In one embodiment, the dispersants being a reaction product of polyisobutylene with maleic acid and/or anhydride can be used to make self dispersable or re-dispersable pigment concentrates for colouring ceramic articles. In this embodiment, a continuous media that can be evaporated off or removed by centrifugation can be used to conduct the milling and then the pigment with dispersant thereon can be concentrated, stored, shipped etc., until needed in dispersion form. If a composition is required comprising a particulate solid and a dispersant being a reaction product of polyisobutylene with maleic acid and/or anhydride in dry form, the organic liquid is typically volatile so that it may be readily removed from the particulate solid by a simple separation means such as evaporation. In one embodiment, the composition comprises an organic liquid continuous media having the prescribed low levels of water or free of water.

The compositions of the invention are suitable for preparing mill-bases wherein the particulate solid is milled in an organic liquid in the presence of a compound being a reaction product of polyisobutylene with maleic acid and/or anhydride. These mill-bases can be mixed in precise ratios to form colourants for ceramic articles having specific colour intensity and shade. It is anticipated that colourants for application by ink jet technology will comprise at least 3 and up to 12 different colours that can be ink jetted to form a variety of colours, shades, intensities, etc., on ceramic articles after firing at 600° C. or more.

Typically, the mill-base contains from 20 to 60% by weight particulate solid based on the total weight of the mill-base. In one embodiment, the particulate solid is not less than 20 or not less than 25% by weight of the mill-base. Such mill-bases may optionally contain a binder added either before or after milling.

The amount of dispersant in the mill-base is dependent on the amount of particulate solid but is typically from 1 to 20% by weight of the mill-base.

Dispersions and mill-bases made from the composition of the invention are particularly suitable as pigment dispersions for use in solvent-based inks for ceramic articles especially ink jet printed ceramic objects that are fired at 600° C. or above to develop the pigment color characteristic such as wall and floor tiles.

This disclosure also includes a process for digitally printing on ceramic article or glass article using an ink jetted through a nozzle;
a) providing a mixed metal oxide pigment dispersed in a continuous nonpolar organic medium with a dispersing agent being a reaction product of polyisobutylene with maleic acid and/or anhydride;
b) jetting said mixed metal oxide dispersed in said continuous medium and said dispersing agent according to a digital image to form an image that develops on said ceramic article or glass article during firing (wherein said ceramic article optionally has one or more pre-glaze layer(s) thereon prior to receiving said digital image);
c) optionally, applying a glaze over said digital image; and
d) firing said ceramic article or glass article at an elevated temperature to cause said mixed metal oxide to develop its color.

The coatings or inks made from mixed metal oxide dispersions and dispersants of this specification differ from conventional organic binder based coatings and inks in two additional details. In a preferred embodiment, the binder (if any) in the coatings and inks of this specification are substantially (e.g. ≥90 wt. %, ≥95 wt. %, or ≥99 wt. % based on the dried and heat-treated coating or ink) inorganic material rather than organic material. A second significant difference is that the dispersants of this specification are significantly volatilized or burned away (e.g. ≥80 wt. %, ≥90 wt. %, or ≥99 wt. % of the dispersant is volatilized or burned away based on the weight of the dispersant prior to heat treatment). Thus, in organic binder systems the organic dispersant is retained in the final ink or coating as an interface between the binder and the particulate matter. In the inks and coatings of this specification, the dispersant is only present until the heat treatment of the article and the coating or ink to melt and fuse the ink to the ceramic or glass substrate. After the heat treatment, the dispersant is substantially burned away or volatilized so that the coating or ink and the particulate (e.g., pigment (mixed metal oxide) or vitreous material of the glaze) is substantially free of any organic dispersant at the interface between the particulate and the inorganic materials of the ceramic or glass.

Ceramic articles will generally mean a variety of useful and decorative items formed from clay and porcelain that develop additional strength from an elevated temperature treatment (such as about 400 to about 1200° C.) that fuses the inorganic material providing additional mechanical strength and resistance to liquids. They include, but are not limited to, tiles in various sizes and shapes, cups, jars, crocks, other storage vessels, bowls, plates, utensils, jewelry, bricks, floor, ceiling, and wall tiles, etc. The ceramic articles can be intended for use inside a dwelling or for exterior use such as in building construction.

Glass articles include functional and decorative glass articles. Glass differs from ceramic in that ceramic is generally translucent at best where glass (unless intensely coloured) is generally transparent in thicknesses of about 0.5 mm such that size ten type can be read through glass panes under normal sunlight conditions. For the purpose of this specification, glass articles will generally have high concentrations of silica (e.g., $SiO_2$) of at least 50% by weight based on the entire glass portion of the article. Examples of glass compositions include lead-oxide glass at 59 wt. % silica, 2 wt. % $Na_2O$, 25 wt. % PbO, 12 wt. % $K_2O$, 0.4 wt. % alumina and 1.5 wt. % Zn; sodium borosilicate glass with about 81 wt. % silica, 12 wt. % $B_2O_3$, 4.5 wt. % $Na_2O$, and 2 wt. % $Al_2O_3$; soda-lime-silica window glass with about 72 wt. % silica, 14.2 wt. % $Na_2O$, 25 wt. % MgO, 10 wt. % CaO, and 0.6 wt. % $Al_2O_3$; and fused silica glass with 95+wt. % silica. Glass articles can generally include, but is not limited to, glass panes (including curved and non-flat panes), tubes, vials, bottles, beakers, flasks, glasses, cups, plates, bowls, pans, lenses, vessels, jars, spheres/balls, etc. In the past, screen printing has been used to decorate some glass containers and articles with mixed metal oxide type pigments formed into an inorganic ink. These can somewhat permanently identify the contents with source, content, or trademark identification.

The following examples provide illustrations of the invention. These examples are non-exhaustive and are not intended to limit the scope of the invention.

EXAMPLES

List of Dispersant Ingredients
Dispersant Example 1 is Polyisobutylenesuccinic anhydride of MW750 with an acid value of 128 mgKOH/g.
Dispersant Example 2 is Polyisobutylenesuccinic anhydride of MW750 with an acid value of 150 mgKOH/g.
Dispersant Example 3 is Polyisobutylenesuccinic anhydride of MW550 with an acid value of 177 mgKOH/g.
Dispersant Example 4 is Polyisobutylenesuccinic anhydride of MW1550 with an acid value of 86 mgKOH/g.
Dispersant Example 5 is Polyisobutylenesuccinic anhydride of MW2300 with an acid value of 43 mgKOH/g.
Dispersant Example 6 is Polyisobutylenesuccinic anhydride of MW1000 with an acid value of 127 mgKOH/g.
Dispersant Example 7 is Polyisobutylenesuccinic anhydride of MW2000 with an acid value of 74 mgKOH/g.
Dispersant Example 8 is Polyisobutylenesuccinic anhydride of MW1000 with an acid value of 112 mgKOH/g.
Dispersant Example 9 is Polyisobutylenesuccinic diacid of MW1000 with an acid value of 170 mgKOH/g.
Dispersant Example 10 is Polyisobutylenesuccinic anhydride of MW2000 with an acid value of 93 mgKOH/g.
Dispersant Example 11 is Polyisobutylenesuccinic anhydride of MW2300 with an acid value of 69 mgKOH/g.
Dispersant Example 12 is Polyisobutylenesuccinic diacid of MW1000 with an acid value of 60 mgKOH/g.
Dispersant Example 13 is Polyisobutylenesuccinic anhydride of MW550 with an acid value of 95 mgKOH/g.
Dispersant Example 14 is Polyisobutylenesuccinic diacid of MW550 with an acid value of 86 mgKOH/g.
Comparative Milling Tests
Pigment Red 233 Dispersions
Dispersions are prepared by dissolving dispersants (28.69 parts) in Exsol D140 (ex. Exxon Mobil) (205.06 parts). Sicocer F Pink 10307 pigment (ex. BASF) (191.25 parts) was added to each mixture and each were premixed using a saw tooth impeller at 2000 rpm for 60 mins.
Pigment Brown 33 Dispersions
Dispersions are prepared by dissolving dispersants (24 parts) in Exsol D140 (ex. Exxon Mobil) (216 parts). Sicocer F Brown 2726 pigment (ex. BASF) (160 parts) was added to each mixture and each were premixed using a saw tooth impeller at 2000 rpm for 60 mins.
Pigment Yellow 159 Dispersions
Dispersions are prepared by dissolving dispersants (27 parts) in Exsol D140 (ex. Exxon Mobil) (193 parts). Sicocer F Yellow 2214 pigment (ex. BASF) (180 parts) was added to each mixture and each were premixed using a saw tooth impeller at 2000 rpm for 60 mins.

Each premix was then milled using a Netzsch LAbStar/Mini Mill and a "mini" grinding chamber (0.16l) under the following conditions: a 75% bead charge of 0.3-0.4 mm YTZ beads at 4000 rpm, a pump speed of 15 rpm and a mill temperature of 30-40° C.; until a particle size of $D_{50}$ less than 600 nm and a $D_{90}$ of less than 900 nm was achieved. Particles sizes were obtained by taking a sample of the milling dispersion (0.04 parts) and diluting in toluene (8 parts) and measuring the particle size on a Nanotrac DLS particle size analyzer. Viscosity measurements of the dispersions were obtained using a TA 200EX Rheometer with a 2° aluminum cone at a temperature of 25° C.

Pigment Red 233 Dispersions

| Agent | Milling Time mins | Viscosity cps @30 $s^{-1}$ | Viscosity cps @30 $s^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 30 | 22 | 33 | 295/480 | 292/714 |
| Dispersant Example 2 | 60 | 25 | 29 | 310/482 | 289/518 |
| Dispersant Example 3 | 60 | 12 | 62 | 356/735 | 347/497 |
| Dispersant Example 4 | 30 | 15 | 27 | 304/424 | 298/451 |
| Dispersant Example 5 | 60 | 34 | 53 | 268/558 | 295/562 |
| Dispersant Example 6 | 30 | 19 | 24 | 299/413 | 310/526 |
| Dispersant Example 7 | 120 | 26 | 42 | 366/484 | 300/559 |
| Dispersant Example 8 | 120 | 25 | 27 | 300/528 | 255/558 |
| Dispersant Example 9 | 60 | 17 | 33 | 294/503 | 416/576 |
| Dispersant Example 10 | 60 | 36 | 44 | 463/635 | 287/566 |
| Dispersant Example 11 | 60 | 27 | 35 | 393/662 | 276/409 |
| Dispersant Example 12 | 120 | 28 | 32 | 349/589 | 345/674 |
| Control (No Dispersant) | NA | N/A | N/A | nm | nm |

Control failed and gelled in the milling.

Pigment Brown 33 Dispersions

| Agent | Milling Time mins | Viscosity cps @30 $s^{-1}$ | Viscosity cps @30 $s^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 6 | 120 | 14.5 | 16 | 258/415 | 272/379 |
| Dispersant Example 8 | 120 | 20.5 | 23 | 258/449 | 236/394 |
| Dispersant Example 13 | 120 | 18 | 12 | 359/653 | 320/740 |

-continued

| Agent | Milling Time mins | Viscosity cps @30 s$^{-1}$ | Viscosity cps @30 s$^{-1}$ (after 3 weeks at 40° C.) | Particle Size nm D$_{50}$/D$_{90}$ | Particle Size nm D$_{50}$/D$_{90}$ (after 3 weeks at 40° C.) |
|---|---|---|---|---|---|
| Dispersant Example 14 | 120 | 15 | 12 | 345/604 | 282/603 |
| Control (No Dispersant) | N/A | N/A | N/A | 693 | 3850 |

Control failed and gelled in the milling.

Pigment Yellow 159 Dispersions

| Agent | Milling Time mins | Viscosity cps @30 s$^{-1}$ | Viscosity cps @30 s$^{-1}$ (after 3 weeks at 40° C.) | Particle Size nm D$_{50}$/D$_{90}$ | Particle Size nm D$_{50}$/D$_{90}$ (after 3 weeks at 40° C.) |
|---|---|---|---|---|---|
| Dispersant Example 6 | 120 | 20 | 18 | 285/470 | 259/451 |
| Dispersant Example 8 | 120 | 23.5 | 25 | 277/408 | 258/373 |
| Control (No Dispersant) | NA | N/A | N/A | nm | nm |

Control failed and gelled in the milling.

While the invention has been explained in relation to its preferred embodiments, it is to be understood that various modifications, thereof, will become apparent to those skilled in the art upon reading the specification. Therefore, it is to be understood that the invention disclosed herein is intended to cover such modifications as fall within the scope of the appended claims.

What is claimed is:

1. A composition, wherein the composition is a pigment dispersion comprising:
    a) 20-79 wt.% of a continuous phase liquid non-polar organic media having less than 7 wt.% water based on the weight of the dispersion;
    b) 20-60 wt.% of a mixed metal oxide ceramic pigment in particulate form that develops its full color intensity and hue after firing at elevated temperatures; and
    c) 1-20 wt.% of a dispersant comprising the reaction product of polyisobutylene with maleic acid and/or anhydride under reaction conditions to form a chemically coupled molecule;
    wherein said reaction product of polyisobutylene with maleic acid and/or anhydride has a number average molecular weight from 500 and 2500 g/mole and an acid number from 40 to 200 mgKOH/g of dispersant;
    wherein said non-polar organic continuous phase has a molecular weight from about 200 to about 20,000 g/mole and is comprised of mostly carbon and hydrogen with up to 10 wt.% of combined heteroatoms selected from nitrogen and oxygen based on the weight of said organic continuous phase; and
    wherein the particulate solid is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

2. A process for milling an inorganic mixed metal oxide particulate, having a dry powder volume average particle diameter D$_{50}$ in excess of 2 micron, in a continuous organic medium to a D$_{50}$ particle size of less than 600 nanometers, said process comprising:
    a) blending said continuous organic medium, said inorganic mixed metal oxide particulate, wherein said inorganic mixed metal oxide particulate is a mixed metal oxide pigment that develops its color intensity and hue after firing at elevated temperatures, optionally including a vitreous glaze material, having a dry powder volume average particle diameter in excess of 2 micron, and a dispersing agent comprising a reaction product of polyisobutylene with maleic acid and/or anhydride;
    b) milling said mixed metal oxide pigment dispersed with said dispersing agent in said continuous medium using a bead mill for 5 minutes to 60 hours forming a dispersion of said mixed metal oxide in said continuous medium; and
    c) confirming the volume average particle diameter D$_{50}$ is less than 600 nanometers;
    wherein said reaction product of polyisobutylene with maleic acid and/or anhydride has a number average molecular weight from 500 and 2500 g/mole and an acid number from 40 to 200 mgKOH/g of dispersant;
    wherein said continuous organic medium has a molecular weight from about 200 to about 20,000 g/mole and is comprised of mostly carbon and hydrogen with up to 10 wt.% of combined heteroatoms selected from nitrogen and oxygen based on the weight of said organic continuous phase; and
    wherein the particulate is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

3. The process according to claim 2, wherein the continuous organic medium comprises less than 7 wt.% water based on the weight of the dispersion.

4. The process according to claim 3, wherein the continuous organic medium comprises an organic solvent with less than 5 wt.% water based on the weight of the dispersion.

5. A process for digitally printing on ceramic article or glass article substrate using an ink jetted through a nozzle;
    a) providing a mixed metal oxide dispersed in a continuous nonpolar organic medium with a dispersing agent comprising a reaction product of polyisobutylene with maleic acid and/or anhydride;
    b) jetting said mixed metal oxide dispersed in said continuous medium using said dispersing agent onto said substrate to form a pigmented digital image (optionally on a pre-glaze layer(s) on a ceramic surface), wherein said pigmented digital image on said substrate develops into a colored image upon firing said ceramic substrate or heating said glass substrate to provide tempering or annealing;
    c) optionally applying a glaze over said digital image; and
    d) heating said ceramic article at an elevated temperature or heating said glass article to anneal or temper it, wherein said image from mixed metal oxide develops optimal color intensity upon heating to its color;
    wherein said reaction product of polyisobutylene with maleic acid and/or anhydride has a number average molecular weight from 500 and 2500 g/mole and an acid number from 40 to 200 mgKOH/g of dispersant;
    wherein said continuous nonpolar organic medium has a molecular weight from about 200 to about 20,000 g/mole and is comprised of mostly carbon and hydrogen with up to 10 wt.% of combined heteroatoms selected from nitrogen and oxygen based on the weight of said organic continuous phase; and wherein the mixed metal oxide is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

6. The process of claim 5, wherein the mixed metal oxide pigment develops its color intensity and hue after firing at 600° C. or above for a ceramic substrate or 400° C. or above for a glass substrate.

* * * * *